(12) United States Patent  
Lin et al.

(10) Patent No.: US 12,538,240 B2  
(45) Date of Patent: Jan. 27, 2026

(54) TRANSMISSION POWER CONTROLS IN WIRELESS COMMUNICATION DEVICES

(71) Applicant: Hewlett-Packard Development Company, L.P., Spring, TX (US)

(72) Inventors: I-Chen Lin, Taipei (TW); Chung-Chun Chen, Taipei (TW); Cheng-Fang Lin, Taipei (TW); Hung-Wen Cheng, Taipei (TW); Isaac Lagnado, Spring, TX (US); Leo Joseph Gerten, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 366 days.

(21) Appl. No.: 18/264,656

(22) PCT Filed: Mar. 12, 2021

(86) PCT No.: PCT/US2021/022139  
§ 371 (c)(1),  
(2) Date: Aug. 8, 2023

(87) PCT Pub. No.: WO2022/191856  
PCT Pub. Date: Sep. 15, 2022

(65) Prior Publication Data  
US 2024/0121722 A1    Apr. 11, 2024

(51) Int. Cl.  
*H04W 52/24* (2009.01)  
*H04W 52/26* (2009.01)

(52) U.S. Cl.  
CPC ....... *H04W 52/241* (2013.01); *H04W 52/262* (2013.01); *H04W 52/267* (2013.01)

(58) Field of Classification Search  
CPC ... H04W 52/24; H04W 52/241; H04W 52/26; H04W 52/262; H04W 52/267; H04L 1/0026; H04L 1/0029  
See application file for complete search history.

(56) References Cited

U.S. PATENT DOCUMENTS

| | | | |
|---|---|---|---|
| 7,680,206 B2 | 3/2010 | Tujkovic et al. | |
| 7,764,727 B2 | 7/2010 | Ye et al. | |
| 7,808,954 B2 | 10/2010 | Nam et al. | |
| 8,185,146 B2 * | 5/2012 | Dinan | H04W 52/42 455/67.11 |
| 8,837,406 B2 * | 9/2014 | Kim | H04W 52/286 370/329 |
| 8,958,799 B2 * | 2/2015 | Vangala | H04W 36/26 370/332 |
| 9,049,701 B2 | 6/2015 | Ali et al. | |
| 9,236,985 B2 * | 1/2016 | Chen | H04L 1/06 |
| 9,307,549 B2 | 4/2016 | Fernando et al. | |
| 9,432,949 B2 * | 8/2016 | Kim | H04W 52/346 |
| 9,674,792 B2 | 6/2017 | Hu et al. | |
| 10,003,486 B2 * | 6/2018 | Zhu | H04W 52/241 |

(Continued)

FOREIGN PATENT DOCUMENTS

WO  2015/103630 A1  7/2015

*Primary Examiner* — Hai V Nguyen  
(74) *Attorney, Agent, or Firm* — Quarles & Brady LLP

(57) ABSTRACT

An example device is to monitor communications throughput rates and select modulation and coding protocols in order to minimize specific absorption rates experienced by users of the devices by minimizing or reducing transmission power settings.

15 Claims, 6 Drawing Sheets

(56) References Cited

U.S. PATENT DOCUMENTS

| | | | | |
|---|---|---|---|---|
| 10,135,562 | B2* | 11/2018 | Zhang | H04L 1/0025 |
| 10,531,403 | B2* | 1/2020 | Sutskover | H04W 52/245 |
| 10,855,422 | B2* | 12/2020 | Abedini | H04L 5/0051 |
| 10,873,413 | B2* | 12/2020 | Zhang | H04L 1/0003 |
| 11,096,186 | B2* | 8/2021 | Wang | H04B 7/063 |
| 11,122,551 | B2* | 9/2021 | Kwon | H04W 72/23 |
| 11,211,964 | B1* | 12/2021 | Chang | H04B 1/40 |
| 11,335,994 | B2* | 5/2022 | Kim | H01Q 3/24 |
| 12,143,938 | B2* | 11/2024 | Lu | H04W 52/36 |
| 12,316,448 | B2* | 5/2025 | Frenzel | H04L 1/0052 |
| 12,356,504 | B2* | 7/2025 | Jung | H04W 8/186 |
| 12,425,983 | B2* | 9/2025 | Takeda | H04W 52/365 |
| 2011/0103498 | A1 | 5/2011 | Chen et al. | |
| 2012/0147801 | A1* | 6/2012 | Ho | H04W 52/365 370/311 |
| 2012/0213172 | A1* | 8/2012 | Kim | H04W 52/286 370/329 |
| 2013/0122827 | A1* | 5/2013 | Ali | H04B 1/3838 455/77 |
| 2014/0113630 | A1* | 4/2014 | Vangala | H04W 36/26 455/436 |
| 2015/0003385 | A1* | 1/2015 | Kim | H04W 52/18 370/329 |
| 2017/0289926 | A1* | 10/2017 | Sutskover | H04W 52/242 |
| 2018/0288709 | A1* | 10/2018 | Yao | H04W 52/367 |
| 2019/0305878 | A1 | 10/2019 | Bienas et al. | |
| 2019/0364545 | A1* | 11/2019 | Kwon | H04L 1/0026 |
| 2021/0314238 | A1* | 10/2021 | Cioffi | H04L 41/5067 |
| 2021/0408671 | A1* | 12/2021 | Kim | H01Q 3/24 |
| 2021/0408685 | A1* | 12/2021 | Chang | H01Q 5/371 |
| 2021/0409088 | A1* | 12/2021 | Chang | H04W 52/288 |
| 2022/0077591 | A1* | 3/2022 | Kim | H01Q 3/44 |
| 2022/0159581 | A1* | 5/2022 | Lu | H04W 52/262 |
| 2022/0159582 | A1* | 5/2022 | Lu | H04W 52/36 |
| 2022/0191730 | A1* | 6/2022 | Meylan | H04W 28/0268 |
| 2023/0180131 | A1* | 6/2023 | Kragten | H04W 52/0251 455/574 |
| 2023/0180146 | A1* | 6/2023 | Takeda | H04W 52/146 455/522 |
| 2023/0216604 | A1* | 7/2023 | Yu | H04W 72/232 370/329 |
| 2023/0217240 | A1* | 7/2023 | Jung | H04W 8/186 455/422.1 |
| 2023/0239080 | A1* | 7/2023 | Marinier | H04L 1/189 714/748 |
| 2023/0299484 | A1* | 9/2023 | Chang | H01Q 5/335 342/27 |
| 2024/0243468 | A1* | 7/2024 | Shen | H01Q 1/521 |
| 2025/0023648 | A1* | 1/2025 | Shen | H01Q 21/28 |

* cited by examiner

TRANSMISSION POWER CONTROLS IN WIRELESS COMMUNICATION DEVICES

BACKGROUND

Wireless electronic communication devices such as cellphones and wireless networked computers often produce electromagnetic radiation. In some circumstances such electromagnetic radiation can be harmful to humans and other living creatures. It can therefore be important in some circumstances to control the amount of electromagnetic radiation produced by wireless communication devices.

For example, in many wireless communication devices, including wireless telephones and tablet, laptop, and other computers having wireless network communication ability, it can be important to ensure that radiation levels generated by wireless transmissions do not exceed recommended specific absorption rates (SARs).

BRIEF DESCRIPTION OF THE DRAWINGS

Various aspects and examples of the disclosure are illustrated in the accompanying drawings, which are meant to be exemplary and not limiting, and in which like references are intended to refer to like or corresponding parts.

DETAILED DESCRIPTION

Figure 1:
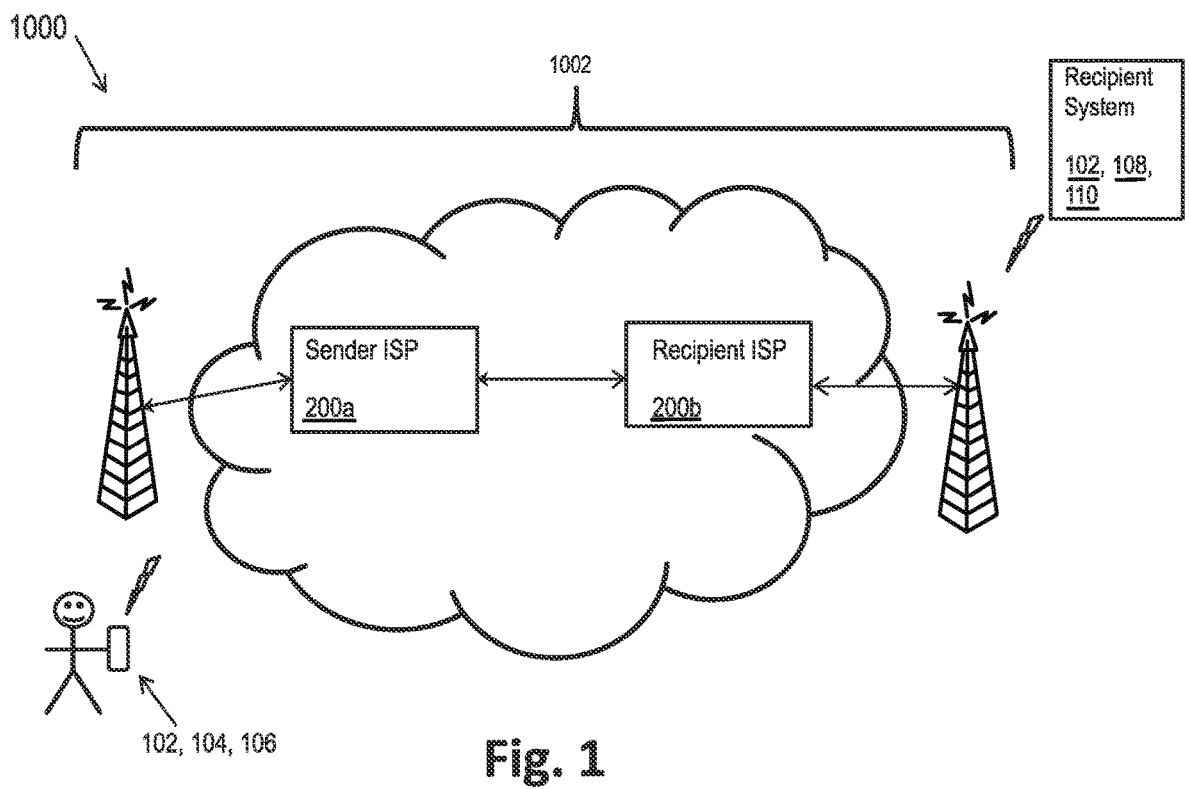
FIG. 1 is a schematic diagram showing an example of a wireless communication system configured in accordance with various aspects and examples of the disclosure.

The disclosure enables improved control of wireless communication devices, to minimize or otherwise reduce electromagnetic radiation levels produced by the devices through selection of modulation and control schemes (MCSs) used during transmission processes, and thereby, for example, to ensure that associated specific absorption rates (SARs) induced by the devices in device users during communication transmissions remain within safe or otherwise preferred levels.

It is known that some wireless devices, for example, are configured to increase transmission power levels in order to maximize the speed of signal transmissions, by selecting suitable transmission protocols. Such processes can, for example, reduce overall power consumption (and associated battery draw) and improve overall network efficiency. By increasing the transmission power consumption associated with a transmission, however, and thereby increasing emitted radiation levels, such transmission schemes typically cause increases in SAR among users and other persons in the proximity of the communication devices, sometimes to unsafe levels. Methods, systems, devices, and corresponding logical structures for controlling transmissions by wireless communication devices in accordance with the disclosure are configured to monitor communications throughput rates and select modulation and coding protocols in order to reduce specific absorption rates experienced by users of the devices by reducing transmission power settings.

The disclosure provides methods, systems, devices, and corresponding logical structures for controlling transmissions by wireless communication devices. Devices 102 in accordance with the disclosure are configured to monitor communications throughput rates and select modulation and coding protocols in order to reduce specific absorption rates experienced by users of the devices by reducing transmission power settings In various aspects and examples, for example, the disclosure provides wireless communication devices, and controllers for wireless communication devices, configured to evaluate real-time device radio transmission bandwidth usage and/or the average data throughput required for any one or more wireless network applications. Based on such assessment, devices and controllers in accordance with the disclosure can select or otherwise adjust radio coding, modulation, and/or spatial stream protocols to maintain minimum required data throughput rate(s) at reduced transmission (TX) power levels. This can for example allow devices equipped with such controllers to maintain communication sessions or other connections at lower transmission power levels, and therefore at reduced SAR exposure levels, for example to ensure that appropriate SAR limits are respected.

It has been observed, for example, that throughput (bit) rates, signal-to-noise ratios (SNRs) and transmission power efficiencies are not the same for all MCSs. In fact, it has been observed that at lower throughput rates many MCS schemes have better bit rate/SNR efficiency, which can translate to enabling transmission of each bit of data with a lower overall transmission power and therefore a lower SAR as well.

Indeed, in some cases it is noted that by operating in accordance with MCSs associated with lower throughput rates, it is possible to transmit communication signals at lower average transmission power settings and SARs, compared to many commonly-employed transmission power duty cycling techniques.

For example, transmission throughput and SAR reduction can be balanced at healthy levels by providing device communication components adapted to implement a variety of modulation and coding schemes, each associated with a specific transmission power and signal-to-noise ratio, and during transmission operations selecting an MCS (or series of MCSs) to ensure that transmission power levels are controlled to minimize SAR levels, or at least to avoid exceeding maximum recommended SAR levels.

For example, it is noted that for a given MCS, effective throughput rates can be dependent upon signal-to-noise ratios (SNRs), while SNRs can be controlled through selection of suitable transmission power levels. Thus, by selecting an MCS associated with a suitable SNR, transmission power can be reduced, along with SAR. Such balance between user experience (throughput) and user exposure (SAR) can be especially beneficial when the average throughput needed by the user is lower than the MCS currently being employed. When this situation occurs an MCS associated with a lower transmission power setting can be selected, thereby still providing the needed throughput rates while at the same time maintaining adequate SNRs and reducing radiation levels and/or SARs experienced by the user.

Thus devices and controllers in accordance with the disclosure can be configured to evaluate real-time device radio bandwidth usage and assess the average minimum data throughput required for any wireless network application;

and to adjust the radio code scheme, modulation, and/or spatial stream (MCS) to maintain the needed data throughput at a reduced TX power. The controller can monitor average data throughput rates and update the MCS throughout a communications process, and thereby allow the device to stay connected at reduced TX power settings and within desirable SAR exposure limits.

The examples described here may be suitable for use with WLAN, WWAN, and other wireless communication technologies.

Aspects and examples of controllers, wireless communication devices, and corresponding systems, processes, methods, and programming structures suitable for use in implementing various aspects and examples of the disclosure can be better understood through reference to the Figures.

FIG. 1 is a schematic diagram showing at 1000 an example of a wireless communication system, or of a system architecture scheme, configured in accordance with aspects of the disclosure. In the example shown, system 1000 comprises a plurality of wireless communication devices 102 and one or more network(s) 1002. While as will be understood at various times, as for example during a telephone conversation or exchange of text or other message data, any of devices 102 can engage either in the sending or receiving of messages, for purposes of explanation it may be help understanding to refer to a device 102 as a sender device 104 while it is conducting transmission operations, and as a receiving or recipient device 108 when it is conduction reception operations. As will be further understood, any or all devices 102 can conduct either or both of sending and receiving operations at any time. Network(s) 1002 can comprise any wireless and/or wireline devices suitable for use in supporting or enabling processes or operations disclosed herein, including for example cellular, local-area, and wide-area networks and network components, such as receivers, transmitters, relays, buffers, and other components; and/or wireline telephone or other networks and components such as telephone and fiberoptic networks and components.

Figure 2:
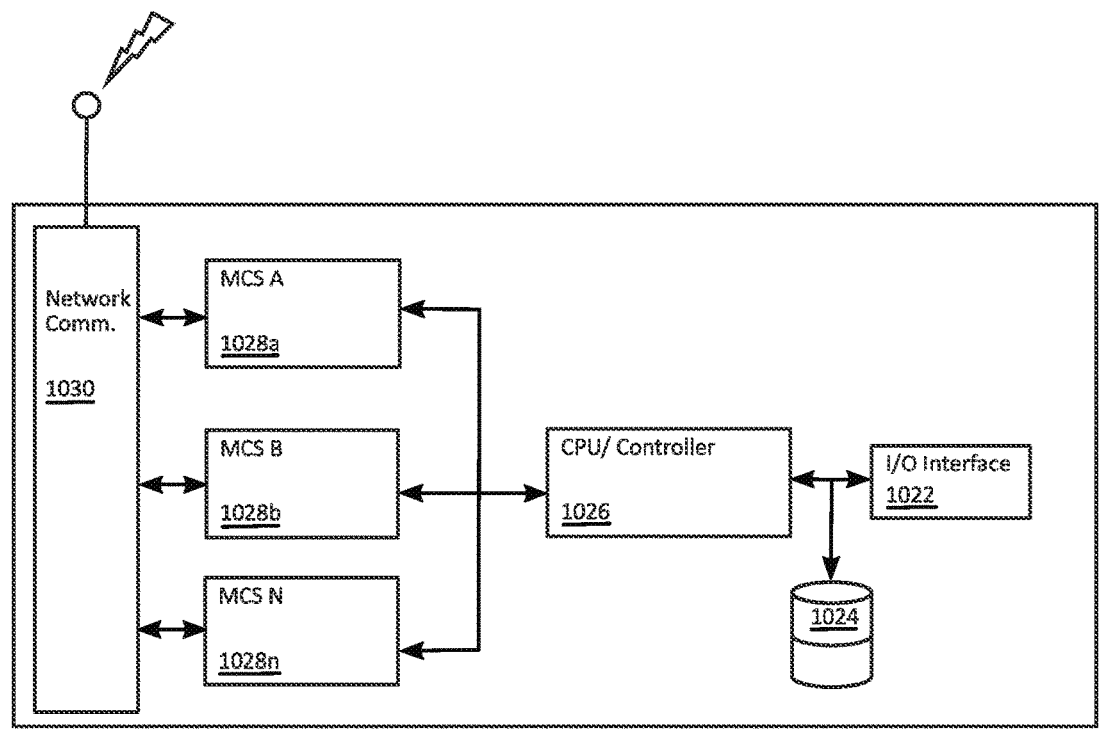
FIG. 2 is a schematic diagram showing an example of a wireless communication device configured in accordance with various aspects and examples of the disclosure.

Examples of components of a wireless communication device 102 suitable for use in implementing systems and processes in accordance with the disclosure are shown in FIG. 2. In the example shown, a wireless communication device 102 comprises one or more processing unit(s), or controller(s), 1026; any desired suitably-configured input/output device(s) 1022, such as keyboards, key pads, or other control buttons or switches, display devices, including touchscreen display devices, speakers, microphones, etc.; memory(ies) 1024; and network communication component(s) 1030, such as transmitters, receivers, signal processors, and antennas, etc. In addition, in example embodiments the device includes software, firmware, and/or hardware configured to enable processing of communication signals in accordance with a plurality of signal processing protocols, including for example any desired types and numbers of MCSs 1028a-1028n. As will be appreciated, device(s) 102 can include any components required or desired for generating, modulating, transmitting, and/or receiving wireless communication signals in accordance with any desired frequencies, modulation schemes, and coding schemes. Moreover, devices 102 can be provided in any of a very wide variety of forms, including for example wireless handheld telephones or radios106, and mobile or desktop, laptop, tablet, or other computers 110, and a very wide variety of special-purpose communication devices.

MCSs and other communications protocols suitable for use in implementing example devices, systems, logical structures such as programming and other computer readable media, and/or processes in accordance with the disclosure can be provided in any desired forms, including for example any or all of quadrature amplitude modulation (QAM), quadrature phase-shifting key (QPSK), binary phase-shifting key (BPSK), and other schemes. A wide variety of suitable protocols are now known, and doubtless others suitable will be developed subsequent to the filing of this disclosure.

Figure 3:
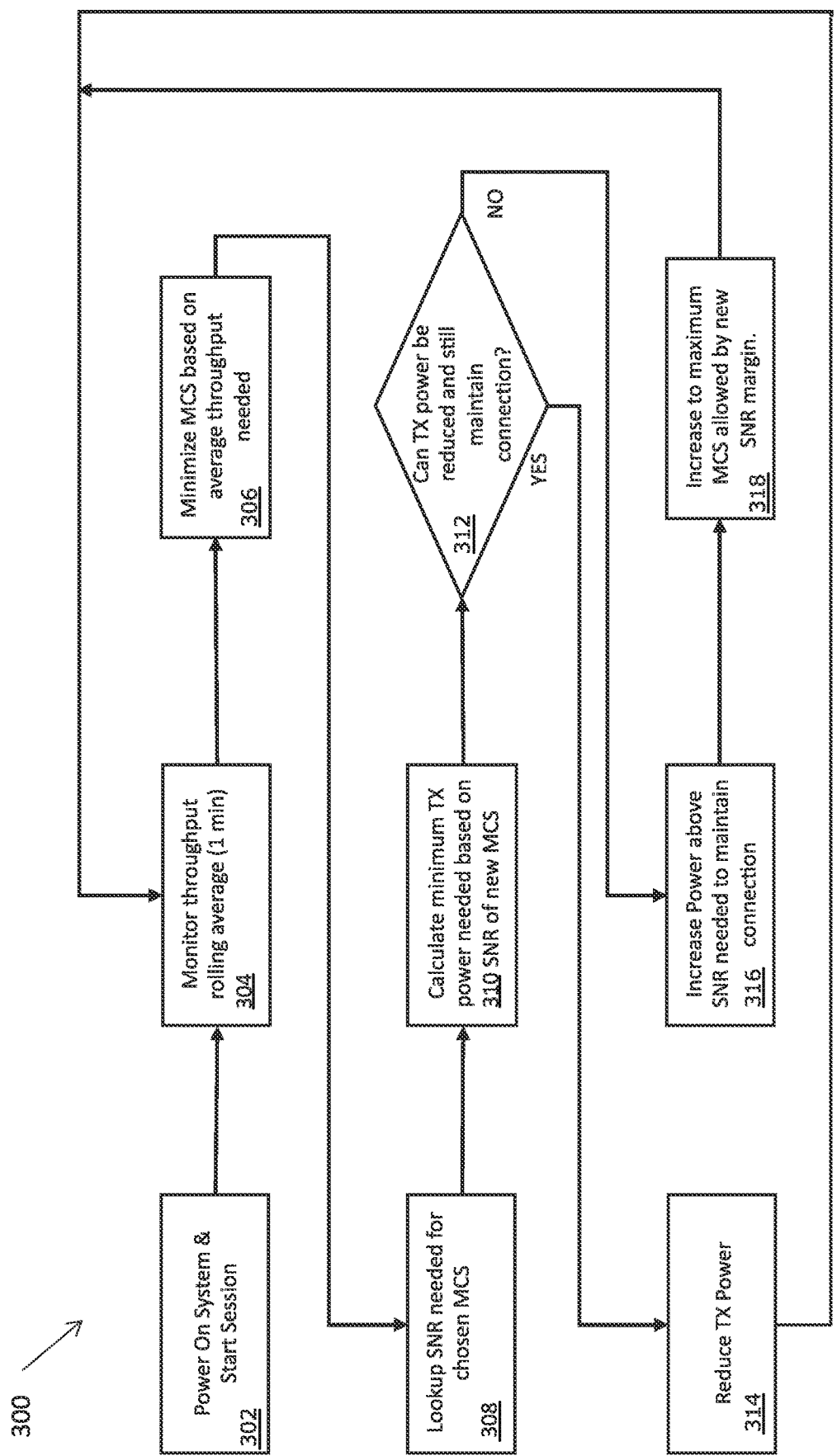
FIGS. 3 through 5 are schematic diagrams showing examples of process flows during data communication operations in accordance with various aspects and examples of the disclosure.
Figure 4:
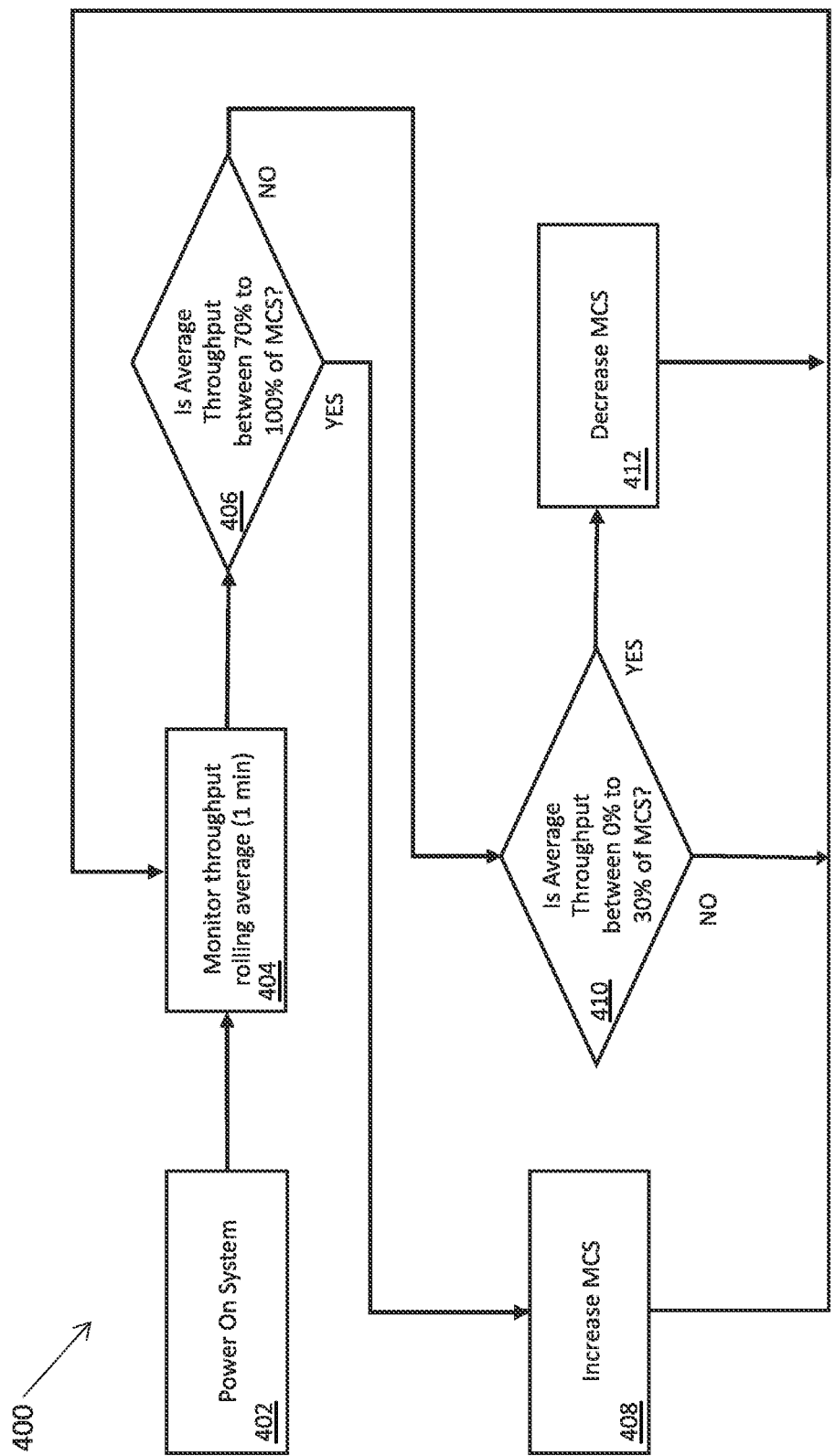
Figure 5:
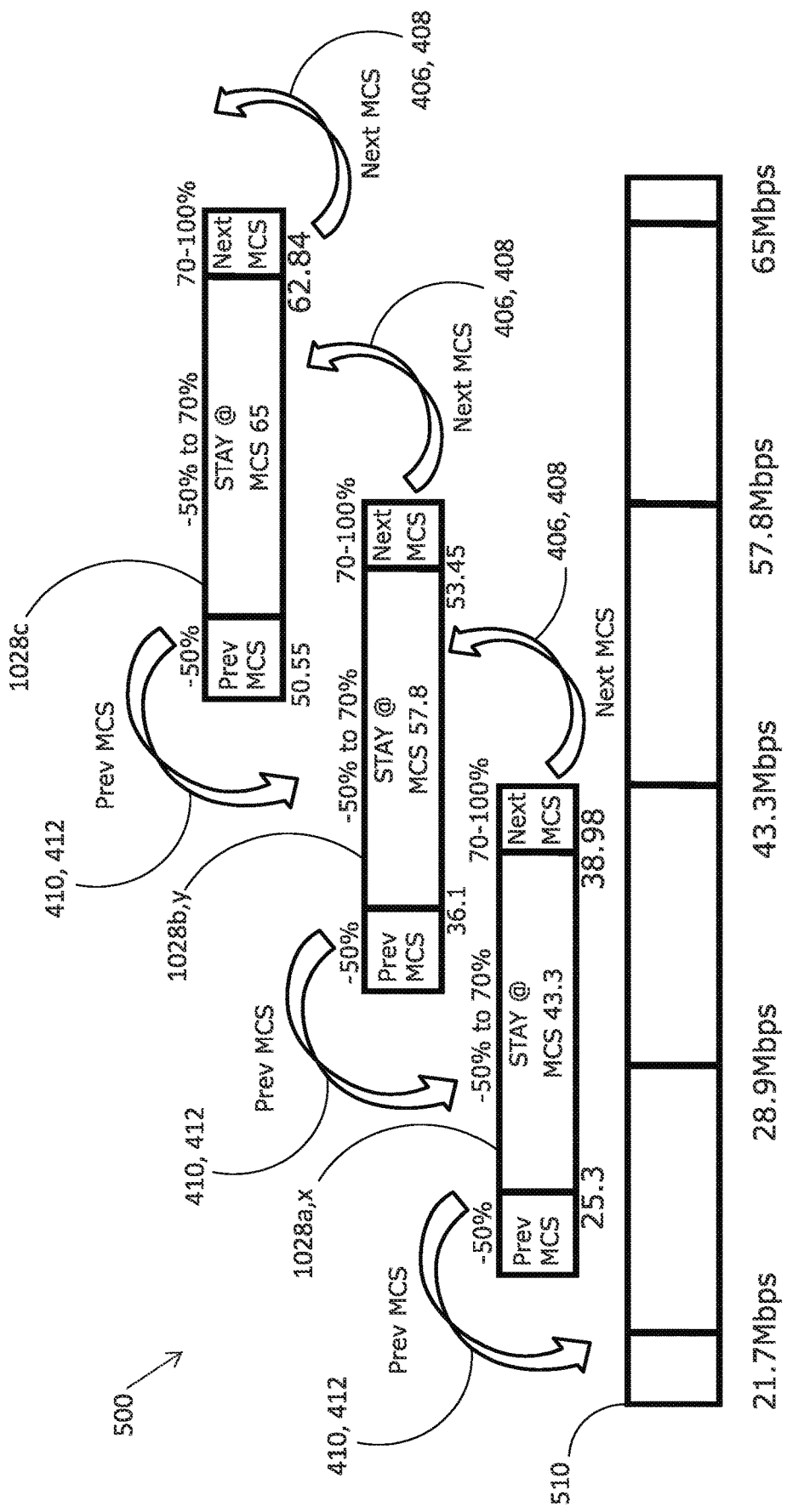

FIGS. 3 through 5 are schematic diagrams showing examples of process flows during data communication operations in accordance with various aspects and examples of the disclosure.

In the example shown in FIG. 3, a process 300 of controlling a call session or other communication transmission can begin at 302, with a user of a device 102, 106 powering the device up and/or simply setting up a transmission session, as for example by turning on and/or dialing a mobile telephone 106, initiating a voice-over-internet (VOIP) session on a laptop computer 110 wirelessly connected to a public or private network 1002, or by initiating any data transmission process, including for example the transmission of large or small data files such as documents, images, videos, etc. Wireless communications can be initiated and processed in a very large number of ways, as will be understood by those skilled in the relevant arts.

As one example of initiating a communication session, a user of a mobile phone 106 can use an I/O interface 1022 such as a touch-controlled display screen of the device 106 configured to act as a dialing number pad, and entering a telephone number of a device 102, 108, 110 associated with a user he or she wishes to talk to. On receiving a command from an I/O interface 1022 to dial or otherwise establish a communication session with a recipient or other device 102, 108 associated with a telephone number or other identifier entered by the sending user, the sender's device 102, 104's controller 1026 can poll a plurality of transmission protocols such as MCSs 1028a-c to select a protocol offering a sufficient bandwidth to support the mode of communication associated with the user's dialing command. For example, the controller 1026 can select an MCS 1028a,b, . . . or n and can begin a process of transmitting communications in accordance therewith, under the control of controller 1026 and through the facilities of a network communication component 1030 of the device 102, 106, etc., which can process communications input generated by an I/O interface 1022 or otherwise received by controller 1026 in accordance with a protocol 1028 and transmit them wirelessly.

In further examples, a user of a device 102 can use an I/O interface 1022 such as a touch-controlled display screen of the device 106 as a keypad to establish a wireless file upload or transfer session with another device 102. As will be understood by those skilled in the relevant arts, systems, devices, and processes in accordance with the disclosure can be used to initiate any data transmission processes.

With a data transmission session begun, at 304 a controller 1026 can begin a process of monitoring transmission throughput, by for example maintaining a rolling average of transmission bit rates over a defined period, such as 30 seconds, 1-6 minutes, or other appropriate length of time. In some examples, periods used in averaging transmission rates can be selected in order to improve the efficiency in compliance with communications regulations imposed by the US Federal Communications Commission, the Canadian agency Innovation, Science and Economic Development Canada, and/or other regulatory body(ies) to control SAR levels associated with transmission processes.

Having determined a current average, instantaneous, or other effective transmission throughput rate, at 306 the controller 1026 can begin a process of reducing or otherwise controlling transmission or SAR-level radiations associated with transmission by determining a minimum transmission throughput rate required to maintain an effective or otherwise desired communications process, and selecting an MCS or other protocol 1028 consistent with such throughput and/or transmission rates.

Based for example on the reduced throughput rate determined at 306, at 308 the controller 1026 can look up, in memory(ies) 1024 or otherwise associated with MCS(s) 1028, a signal-to-noise ratio (SNR) associated with one or more MCSs or other protocols associated with such throughput rate, and at 310 can calculate or otherwise determine a minimum transmission power associated with such reduced throughput rate.

Based on a confirmation at 312 that switching to an MCS associated with a reduced transmission power rate identified at 306-310 can be implemented without losing an effective communications connection, at 314 can switch to such MCS and reduce transmission power, and thereby decrease radiations associated with transmission, and thereby ensure that specific absorption rates (SARs) inflicted on any human or other living users, or any other objects in proximity of the transmitting device 102, 106 are minimized. Upon completing such switch, at 304 the device 102, 106 can repeat the process 304-312 until the communication session is terminated or otherwise concluded by the user or other device or controller.

If at 312 a determination is made that switching to an alternative MCS with a lower transmission power setting cannot be accomplished without losing an effective communication connection, then at 316-318 a current transmission power setting can be maintained, or even increased, in order to maintained the desired communication session. The process 304-312 can be repeated until the communication session is completed.

In the example shown in FIG. 4, a process 400 of controlling a call session or other communication transmission can begin at 402, with a user of a device 102, 106 powering the device up and/or simply setting up a transmission session. Wireless communications can be initiated and processed in a very large number of ways, as will be understood by those skilled in the relevant arts, including those described above in connection with FIG. 3.

With a communication session established, at 404 a controller 1026 can begin a process of monitoring transmission throughput, by for example maintaining a rolling average of transmission bit rates over a defined period, such as 30 seconds, 1-6 minutes, or other appropriate length of time.

At 406 the controller 1026 can determine, by for example consulting in memory(ies) 1024 and/or component buffers or memories associated with MCS or other protocol components 1028, effective throughput rate(s) associated with an active or current protocol established and monitored at 402-404. Controller 1026 can further compare the average or other throughput rate determined at 404 with such rate(s). If the current throughput rate is above a specified level, e.g. above 70%, 75%, 90%, or other specified proportion of the upper effective rate for the MCS or other protocol, at 408 the controller 1026 can poll one or more alternative protocols/MCSs 1028 to identify a protocol/MCS associated with a higher effective throughput rate, and can switch to such protocol/MCS in order to establish a higher throughput rate. Optionally, the selection of such protocol/MCS can comprise a process 304-312 described above to identify and select a protocol/MCS having both a high-enough throughput rate to maintain the connection, and an otherwise reduced transmission power rating, so as to control transmission radiation levels and control associated SARs.

If at 406 it is determined that a throughput rate determined at 404 is not above a specified level, at 410 a determination can be made as to whether the current throughput rate is below a specified rate, e.g. less than 10%, 25%, or 30%, or other specified proportion of a minimum effective rate associated with the MCS required for maintaining the communication session. If the current throughput rate is below such a specified threshold level, then at 412 the controller 1026 can poll one or more alternative protocols/MCSs 1028 to identify a protocol/MCS associated with a lower minimum throughput rate, and can switch to such protocol/MCS in order to establish a suitably lower throughput rate. Optionally, the selection of such protocol/MCS can comprise a process 304-312 described above to identify and select a protocol/MCS having both a low-enough throughput rate to maintain the connection and an otherwise reduced transmission power rating, so as to minimize transmission radiation levels and control associated SARs.

When either or both of determinations 406, 410 have been made, and any desired adjustment of throughput rate, transmission power, and selection of protocol(s)/MCS(s) have been implemented, the process 404-412 can be repeated until the communication session is terminated by the user or other device or controller, or otherwise concluded.

FIG. 5 shows an example of a process 500 of controlling a call session or other communication transmission consistent with the process shown in FIGS. 3 and 4, in which a plurality of protocols/MCSs 1028a,b,c are shown in a schematic relationship based on rising effective data throughput rates. MCSs 1028 are placed in overlapping left-right orientations corresponding to the range of throughput rates they support, as shown for example in throughput spectrum 510. For example, in the example shown MCS 1028a can accommodate throughput rates of approximately 23-43 megabits per second (Mbps), with a preferred effective range of 25.3-38.98 Mbps; MCS 1028b can accommodate throughput rates of approximately 32-58 Mbps, with a preferred effective range of 36.1-53.45 Mbps; and MCS 1028c can accommodate throughput rates of approximately 47-65 Mbps, with a preferred effective range of 50.55-62.84 Mbps. On for example a determination at 406 that a current throughput rate is above 38.98 Mbps, at 408 a controller 1026 can shift from a current MCS 1028a to an MCS 1028b associated with a higher throughput rate. Similarly, on determination at 410 that a current throughput rate is below 50.55 Mbps, at 412 a controller 1026 can shift from a current MCS 1028c to an MCS 1028b associated with a lower throughput rate.

Some advantages that can be realized through application of processes such as processes 300, 400, 500 can be understood through reference to FIGS. 6 and 7.

Figures 6A, 6B:
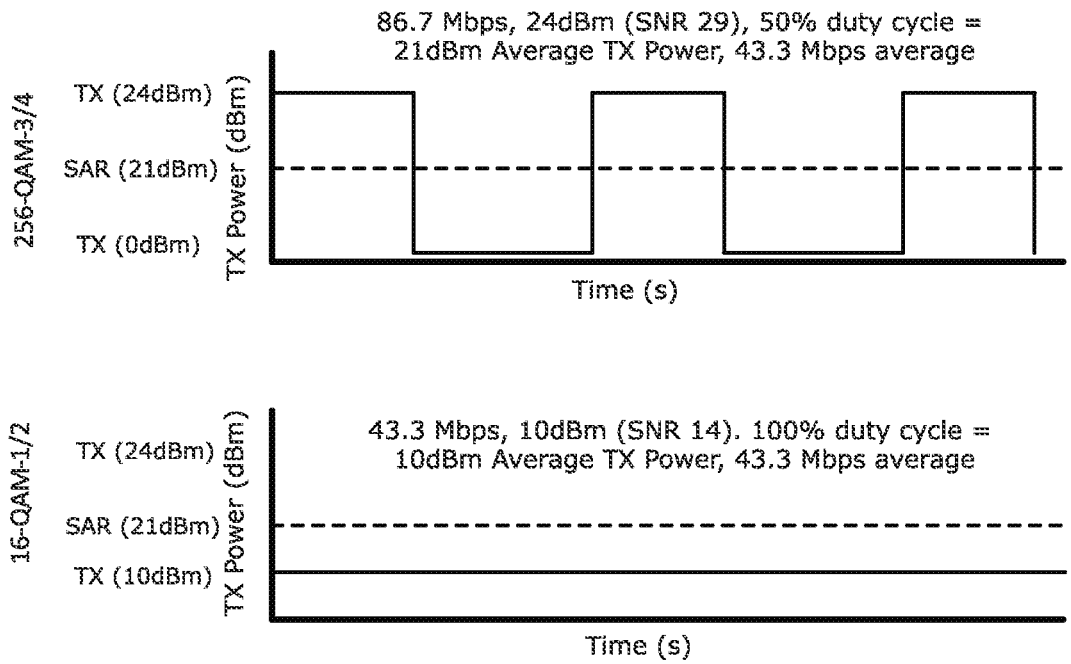
FIGS. 6A, 6B, 7A, and 7B are schematic diagrams illustrating aspects of operations of a wireless communication device in accordance with various aspects and examples of the disclosure.

As may be seen by reference to FIG. 6b, in FIG. 6a a comparison is shown of transmission characteristics associated with an MCS 256-QAM-3/4 associated with of lower and upper threshold throughput rates of 78-86.7 Mbps respectively in the upper chart, and an MCS 16-QAM-1/2 associated with throughput rates of 39-43.3 Mbps in the lower chart. It may be seen in the lower chart of FIG. 6a that selection of the 16-QAM MCS can result in a constant transmission power output of 10 dBm, as opposed to a maximum transmission output of 24 dBm and an average of 21 dBM for the 256-QAM in the upper chart. Reduction of transmission power in this way can be associated with lower SARs for users of the corresponding device(s) 102, while maintaining a consistent throughput rate 602 of 43.3 Mbps average.

Figures 7A, 7B:
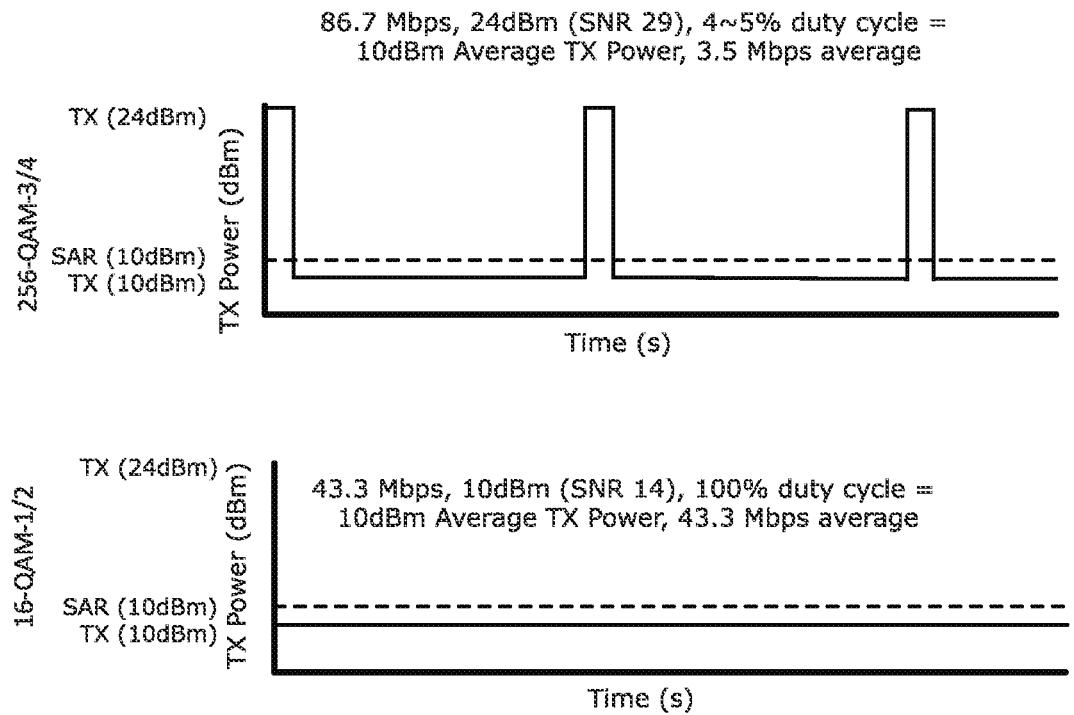

As may be seen by reference to FIG. 7b, in FIG. 7a a comparison is shown of transmission characteristics associated with an MCS 256-QAM-3/4 associated with throughput rates of 78-86.7 Mbps in the upper chart, and an MCS 16-QAM-1/2 associated with throughput rates of 39-43.3 Mbps in the lower chart. It may be seen in the lower chart of FIG. 7a that selection of the 16-QAM MCS can result in a constant transmission power output of 10 dBm, and an average transmission output of 10 dBm for the 256-QAM in the upper chart. For the same transmission power rating, the 16-QAM results in an average 602 43.3 Mbps throughput rate, compared to an average of 3.5 Mbps for the 256-QAM.

Thus, among other aspects and examples, the disclosure herein provides controllers 1026 and wireless communication devices 102, the controllers and devices being configured to communicate wireless signals over a wireless communication network 1002 in accordance with a plurality of signal modulation and coding schemes 1028, each modulation and coding scheme associated with a throughput rate and a signal-to-noise ratio. Such a controller or device can be configured to determine a throughput rate for wireless signals to be processed by the wireless communication device 102 including for example by a communication component 1030; based at least partially on the determined throughput rate, select from the plurality of modulation and coding schemes 1028a-n, a modulation and coding scheme 1028x associated with a minimum or otherwise reduced signal-to-noise ratio for processing of the wireless signals at the determined throughput rate; and transmit the signals over the wireless communication network 1002 in accordance with the modulation and coding scheme 1028, at a minimum power level associated with the minimum required signal-to-noise ratio.

In the same and other aspects and examples, the disclosure provides controllers 1026 and wireless communication devices 102 configured to communicate wireless signals over wireless communication networks 1002 in accordance with a plurality of signal modulation and coding schemes 1028, each modulation and coding scheme associated with a throughput rate and a signal-to-noise ratio. Such a controller or device can be configured to determine a current, or first, throughput rate associated with wireless signals processed by the wireless communication device 102 including for example a communication component 1030; based at least partially on the determined current throughput rate, select from the plurality of modulation and coding schemes 1028a-n a modulation and coding scheme 1028x associated with a minimum or otherwise reduced signal-to-noise ratio for effective processing of the wireless signals at the current throughput rate; transmit the signals over the network communication system 1002 in accordance with the selected modulation and coding scheme, at a reduced power level associated with the reduced signal-to-noise ratio; determine a second or subsequent throughput rate associated with wireless signals processed by the wireless communication device 102, 1030; based at least partially on the subsequent throughput rate, select from the plurality of modulation and coding schemes 1028a-n a second modulation and coding scheme 1028y, the second modulation and coding scheme associated with a reduced signal-to-noise ratio for processing of the wireless signals at the subsequent throughput rate; and transmit the signals over the network communication system in accordance with the selected modulation and coding scheme, at a reduced power level associated with the minimum required signal-to-noise ratio.

In the same and other examples, the disclosure provides wireless communication devices 102 to determine a first, or current, throughput rate for wireless signals to be processed by the wireless communication device; based on the current throughput rate, select a first modulation and coding scheme 1028 associated with a minimum or reduced signal-to-noise ratio for processing of the wireless signals at the current throughput rate; and based on the first modulation and coding scheme, transmit the signals over a wireless communication network at a first reduced transmission power level associated with the first signal-to-noise ratio. Such a device 102 can further determine a second, or subsequent, throughput rate associated with wireless signals processed by the wireless communication device; based on the subsequent throughput rate, select a second modulation and coding scheme, the second modulation and coding scheme associated with a second reduced signal-to-noise ratio for processing of the wireless signals at the subsequent throughput rate; and based on the second modulation and coding scheme, transmit the signals over the wireless communication network at a second minimum transmission power level associated with the second signal-to-noise ratio.

In such examples, determination of the first and second throughput rates can be based on specific absorption rates associated with the first and second reduced transmission power levels.

In the same and other examples, determination of the second throughput rate can be based on a determination whether the first throughput rate exceeds an upper threshold throughput rate associated with the first modulation and coding scheme, and/or on a determination whether the first throughput rate is below a lower threshold throughput rate associated with the first modulation and coding scheme.

In further aspects and examples, the disclosure provides logical structures such as transient and/or non-transient computer-readable media comprising instructions, including for example software, firmware, and other programming or instruction structures or devices representing machine-readable and—executable instructions stored in memory(s) 1024 and/or firmware or other hard-wired structures comprised by or otherwise associated with any or all of protocol/MCS component(s) 1028, controller(s) 1026, and/or network communication component(s) 1030 and configured or otherwise adapted to cause controller(s) 1026, network communication component(s) 1030, and other components of wireless communication device(s) 102 to perform the various process disclosed herein, and/or suitable for use in providing, and/or otherwise corresponding to, the systems, methods, processes, and devices described above. For example, various aspects and embodiments of the disclosure can be implemented in the form of non-transitory computer readable media comprising instructions, which, when executed, cause a controller of a wireless communication device to process signals and data in accordance with the disclosure. For purposes of this disclosure the term "non-transitory" does not encompass transitory propagating signals.

Although the present disclosure has been described with reference to example examples, those skilled in the relevant arts will recognize that many variations and modifications may be made without departing from the spirit and scope of the claimed subject matter. For example, although different example examples may have been described as including features providing various benefits, it is contemplated that the described features may be interchanged or combined with one another in various examples. Except to the extent necessary or inherent in the processes themselves, no particular order to steps or stages of methods or processes described in this disclosure, including the Figures, is intended or implied.

The invention claimed is:

1. A wireless communication device comprising:
a network communication component; and
a controller to:
    determine a current throughput rate associated with wireless signals processed by the wireless communication device;
    based on the current throughput rate, select a first modulation and coding scheme associated with a first reduced signal-to-noise ratio for processing of the wireless signals at the current throughput rate;
    based on the first modulation and coding scheme, transmit the signals over a wireless communication network via the network communication component at a first reduced transmission power level associated with the first signal-to-noise ratio;
    determine a subsequent throughput rate associated with wireless signals processed by the wireless communication device;
    based on the subsequent throughput rate, select a second modulation and coding scheme, the second modulation and coding scheme associated with a second reduced signal-to-noise ratio for processing of the wireless signals at the subsequent throughput rate; and
    based on the second modulation and coding scheme, transmit the signals over the wireless communication network via the network communication component at a second reduced transmission power level associated with the second reduced signal-to-noise ratio.

2. The device of claim 1, wherein determinations of the current and subsequent throughput rates are based on specific absorption rates associated with the first and second transmission power levels.

3. The device of claim 1, wherein determination of the subsequent throughput rate is based on a determination whether the current throughput rate exceeds a threshold throughput rate associated with the first modulation and coding scheme.

4. The device of claim 1, wherein determination of the subsequent throughput rate is based on a determination whether the current throughput rate exceeds a lower threshold throughput rate associated with the first modulation and coding scheme.

5. Non-transitory computer readable media comprising instructions, when executed, cause a controller of a wireless communication device to:
    determine a current throughput rate associated with wireless signals processed by the wireless communication device;
    based on the current throughput rate, select a first modulation and coding scheme associated with a first reduced signal-to-noise ratio for processing of the wireless signals at the current throughput rate;
    based on the first modulation and coding scheme, transmit the signals over a wireless communication network via the network communication component at a first reduced transmission power level associated with the first reduced signal-to-noise ratio;
    determine a subsequent throughput rate associated with wireless signals processed by the wireless communication device;
    based on the subsequent throughput rate, select a second modulation and coding scheme, the second modulation and coding scheme associated with a second reduced signal-to-noise ratio for processing of the wireless signals at the subsequent throughput rate; and
    based on the second modulation and coding scheme, transmit the signals over the wireless communication network at a second reduced transmission power level associated with the second signal-to-noise ratio.

6. The media of claim 5, wherein the determinations of the current and subsequent throughput rates are based on specific absorption rates associated with the first and second transmission power levels.

7. The media of claim 5, wherein the determination of the subsequent throughput rate is based on a determination whether the current throughput rate exceeds an upper threshold throughput rate associated with the first modulation and coding scheme.

8. The media of claim 5, wherein the determination of the subsequent throughput rate is based on a determination whether the current throughput rate below a lower threshold throughput rate associated with the first modulation and coding scheme.

9. A wireless communication device comprising:
a network communication component; and
a controller to:
    determine a current throughput rate for wireless signals to be processed by the wireless communication device;
    based on the current throughput rate, select a first modulation and coding scheme associated with a minimum signal-to-noise ratio for processing of the wireless signals at the current throughput rate; and
    based on the first modulation and coding scheme, transmit the signals over a wireless communication network at a first reduced transmission power level associated with the first signal-to-noise ratio.

10. The device of claim 9, wherein the controller is further to:
    determine a second throughput rate associated with wireless signals processed by the wireless communication device;
    based on the second throughput rate, select a second modulation and coding scheme, the second modulation and coding scheme associated with a second minimum signal-to-noise ratio for processing of the wireless signals at the second throughput rate; and
    based on the second modulation and coding scheme, transmit the signals over the wireless communication network at a second reduced transmission power level associated with the second signal-to-noise ratio.

11. The device of claim 10, wherein the determinations of the first and second throughput rates are based on specific absorption rates associated with the first and second reduced transmission power levels.

12. The device of claim 10, wherein the determination of the second throughput rate is based on a determination whether the first throughput rate exceeds an upper threshold throughput rate associated with the first modulation and coding scheme.

13. The device of claim 10, wherein the determination of the second throughput rate is based on a determination whether the first throughput rate is below a lower threshold throughput rate associated with the first modulation and coding scheme.

14. The device of claim 10, wherein the first and second modulation and coding schemes comprise a binary shifting key protocol.

15. The device of claim 10, wherein the first and second modulation and coding schemes comprise a quadrature shifting key protocol.

\* \* \* \* \*